United States Patent [19]

Mitchell

[11] 3,916,696

[45] Nov. 4, 1975

[54] WHEEL BALANCER MOUNT

[75] Inventor: Wallace F. Mitchell, Libertyville, Ill.

[73] Assignee: Ammco Tools Inc., North Chicago, Ill.

[22] Filed: May 31, 1974

[21] Appl. No.: 475,104

[52] U.S. Cl. .................................. 73/484; 73/483
[51] Int. Cl.² ........................................ G01M 1/12
[58] Field of Search ............ 73/480, 482, 483, 484, 73/485, 486, 487; 144/288 A; 157/1.24, 1.11

[56] References Cited
UNITED STATES PATENTS

| | | | |
|---|---|---|---|
| 2,493,872 | 1/1950 | Henry | 73/485 X |
| 3,204,465 | 9/1965 | Kushmuk et al. | 73/483 |
| 3,742,766 | 7/1973 | Mitchell | 73/484 |

Primary Examiner—James J. Gill
Attorney, Agent, or Firm—Edmond T. Patnaude

[57] ABSTRACT

A wheel balancer mount includes a plurality of bolt hole engaging pins slidably and freely movable on a flat supporting surface mounted to the vertical spindle of a bubble type wheel balancer and a plate provided with a plurality of radial slots supported on the spindle with the pins extending through the slots to prevent inadvertent upsetting of the pins and droppage thereof from the mount during mounting and unmounting of the wheel.

4 Claims, 6 Drawing Figures

WHEEL BALANCER MOUNT

The present invention relates in general to apparatus for testing the balance of wheels for automative vehicles, and it relates more particularly to a new and improved means for mounting wheels on such apparatus.

BACKGROUND OF THE INVENTION

There is described in my earlier issued U.S. Pat. No. 3,742,766 a wheel balancer mount employing a plurality of wheel support pins having enlarged pedestals slidably and freely located on a support plate mounted in a generally horizontal position on the spindle of a bubble balancer. While the balancer and associated wheel mounting assembly described in that patent provides satisfactory results, it is difficult, particularly for the inexperienced, to prelocate the wheel support pins prior to placing the wheel to be balanced thereon. Also, the support pins being movable on the support plate are sometimes upset whereby they roll off the plate onto the floor where they may become knicked thereby to adversely affect subsequent balancing operations.

OBJECTS OF THE INVENTION

Therefore, an object of the present invention is to provide a wheel balancer having the advantages of the aforesaid patented mounting assembly but incorporating means for facilitating the initial rough locating of the wheel support pins on the support plate and for preventing inadvertent dropping of the wheel support pins from the associated support surface.

Another object of the present invention is to provide a new and improved wheel balancer of the bubble balancing type which can be used with substantially all wheels now being used on automotive vehicles.

SUMMARY OF THE INVENTION

Briefly, wheel mounting apparatus embodying the present invention comprises a support plate mounted over the verticle spindle of a bubble balancer, a plurality of wheel support pins having a conical upper end and an enlarged pedestal at the bottom for slidable movement on the planer support surface, and a plate fitted on the wheel balancer spindle in spaced apart relationship from the base plate and having a plurality of radial slots therein through which the wheel support pins extend, which slots are narrower than the diameter of the pedestal whereby to prevent the wheel support pins from tipping over. The pins are readily slideable within the slots and the entire assembly is rotatable relative to the support plate. In accordance with a further aspect of the present invention, a plurality of the guide plates are provided, each with a different number of radial slots for accommodation of wheels having different numbers of bolt holes, and an adapter plate adapted to be removably fitted over the spindle and having a planar surface at the top for supporting the hub portion of wheels having bolt holes which do not match any of those provided by the adapter plates.

BRIEF DESCRIPTION OF THE DRAWING

Further objects and advantages and a better understanding of the present invention may be had from the following detailed description taken in connection with the accompanying drawing wherein.

DETAILED DESCRIPTION OF THE INVENTION

Figure 1:
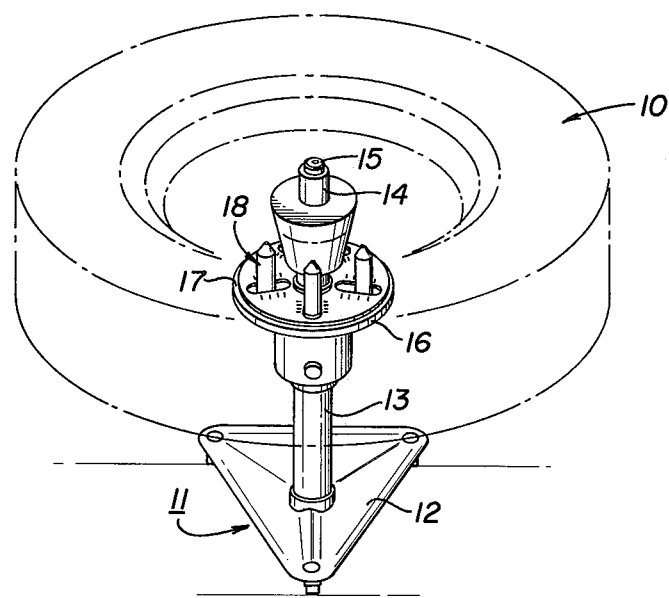
FIG. 1 is a perspective view of a wheel balancer embodying the present invention, a wheel and associated tire which is mounted thereon being shown in phantom.
Figure 2:
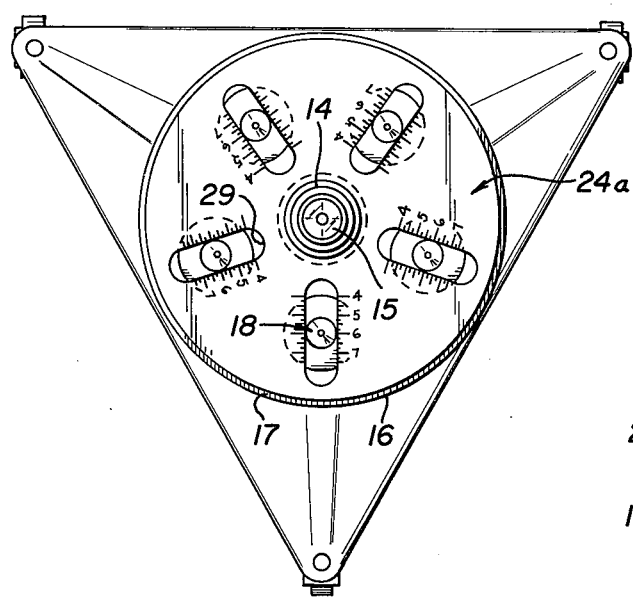
FIG. 2 is a plan view of the wheel balancer of the present invention.

Referring now to the drawing and particularly to FIGS. 1 and 2 thereof, a wheel and associated tire 10 are shown mounted on a wheel balancer 11 including a stand 12 and a vertical post 13 on which a spindle 14 is suitably mounted for universal pivotal movement. One such pivot mechanism is disclosed in U.S. Pat. No. 3,492,878, issued on Feb. 3, 1970 to me and assigned to the same assignee as the present invention. Mounted on top of the spindle 14 is a bubble type spirit level indicator 15. Fixedly connected to the spindle 14 is a circular steel support plate 16 having a planar upper surface 17 lying perpendicular to the principal longigudinal axis of the spindle 14.

Figure 3:
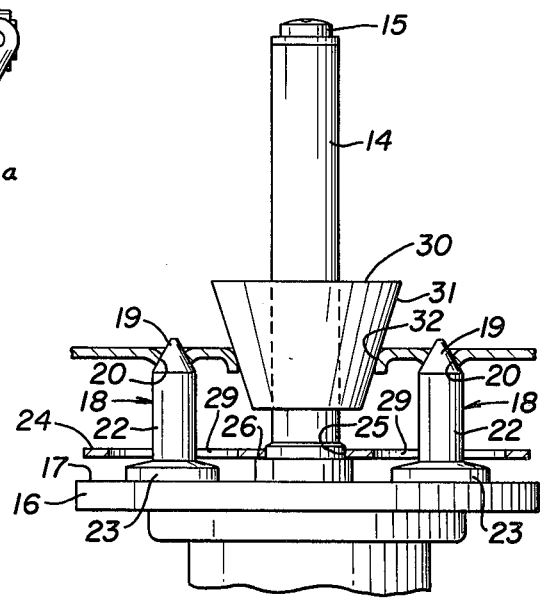
FIG. 3 is a cross sectional view of the wheel mounting portion of a wheel balancer embodying the present invention, the hub portion of a wheel mounted on the balancer being shown therein.

In order to mount the wheel 10 such that the plane thereof is perpendicular to the spindle 14, a plurality of wheel support pins 18 are supported on the planar surface 17 and have conical upper ends 19 which partially extend into the bolt holes 20 of the wheel 10 as best shown in FIG. 3. The pins 18 have equal heights so as to position the plane of the wheel parallel with the plane of the surface 17 and thus perpendicular to the principal longitudinal axis of the spindle 14.

The pins 18 have a cylindrical body portion 22 and an enlarged circular base or pedestal portion 23 having a flat bottom surface resting on the planar surface 17. In order to prealign the pins 18 with the bolt holes 20 in any particular wheel, a circular adapter plate 24 is provided with a central circular opening 25 which rests on an annular seat 26 surrounding the spindle 14 and spaced from the support surface 17 by a distance slightly greater than the height of the pedestal portions 23 of the wheel support pins 18. The adapter plate 24 is provided with a plurality of radial slots 29 through which the body portions 22 of the pins 18 loosely extend. The adapter plate 24 has a number of slots 29 which are equi-antularly spaced and which correspond in number to the number of bolt holes 20 in the wheel to be balanced. The pins 18 are thus angularly fixed relative to one another by means of the plate 24 but are independently movable in a radial direction along the slots 29. Since the slots 29 have a width but slightly greater than the diameter of the body portions 22 for the pins 18 which is substantially less than the diameter of the pedestal portions 23 the pins 18 cannot be tipped over while the plate 24 is in place on the shoulder 26 of the spindle 14. With the pins more or less in the proper positions, the wheel can be lowered over the pedestal 14 and easily positioned on the pins with the conical portions thereof received in the bolt holes 20. The pins 18 will move independently and collectively to facilitate this placement of the wheel thereon. A centering cone 30 of conventional construction is then slipped down over the spindle with the conical centering surface 31 extending into the accurately located center hole 32 in the wheel to be balanced. The slots have a width slightly greater than the diameters of the body portions of the pins 18 to permit sufficient lateral movement of the pins to accommodate for inaccurate positioning of the bolt holes 20. Accordingly, the pins 18 may move along the mounting surface 17 whereby the wheel is accurately centered on the spindle 14.

Figure 4:
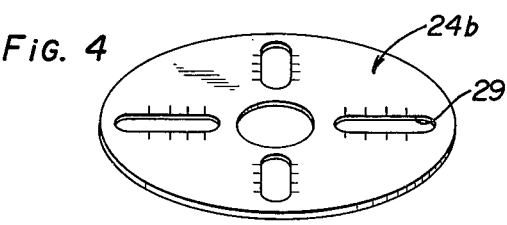
FIG. 4 is a perspective view of another adapter plate usable with the present invention.
Figure 5:
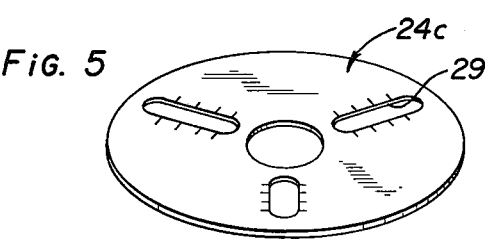
FIG. 5 is a perspective view of still another adapter plate usable in the combination of the present invention.

As illustrated in FIGS. 2, 4 and 5 a plurality of the adapter plates 24 are provided. In FIG. 2 there is shown an adapter plate 24a having five locating slots 29 all equi-angularly spaced relative to one another. In FIG. 4 there is shown an adapter plate 24b having four equally spaced locating slots 29, and in FIG. 5 there is shown an adapter plate 24c having three locating slots 29. Moreover, graduations are provided on the upper surfaces of the plates adjacent to the slots 24a showing the diametric spacing of the pins 18 when located opposite the graduation marks. The graduations further facilitate initial rough placement of the pins on the support plate 17.

Figure 6:
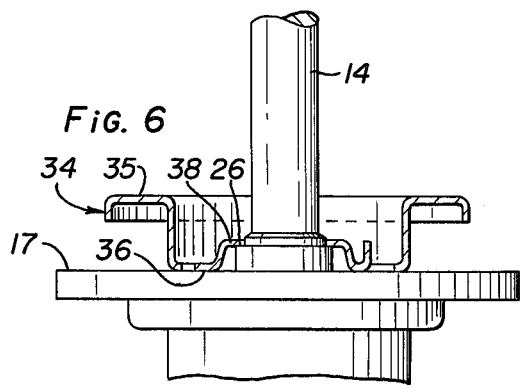
FIG. 6 is a cross sectional view of still another embodiment of this invention.

While the three adapter plates 24a, 24b and 24c will accommodate most all wheel designs now in use, there are still a few designs which cannot be accommodated. For use with these few wheels there is provided, as shown in FIG. 6, a wheel adapter 34 having an upper annular planar surface 35, an annular base portion 36 which rests on the planar surface 17 and a centrally apertured hub portion 38 which rests on the shoulder 26 to center the adapter 34 releative to the spindle 14. The adapter itself is balanced relative to the central vertical axis thereof so as not to affect the wheel balancing operation. The planes of the annular surfaces 35 and 36 are mutually parallel whereby the wheel to be balanced is parallel to the surface 17 when supported on the surface 35. A centering cone 30 is then inserted into the center hole of the wheel, as shown in FIG. 3, to accurately center the wheel on the spindle 14.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What I Claim is:

1. Apparatus for mounting a wheel on a vertically disposed spindle of a bubble type wheel balancer, said wheel having a plurality of mounting holes symmetrically arranged around a central opening, the combination comprising a wheel supporting member fixed to said spindle and having a planar upper surface lying perpendicular to the axis of said spindle,
   a plurality of wheel support members each having a body portion, an enlarged pedestal and an upper end portion for partial reception in a respective one of said mounting holes,
   said members being movably positioned on said planar upper surface,
   a plate removably supported on said spindle above and in spaced parallel relationship with said upper planar surface;
   said plate having therein a central hole and a plurality of symmetrically disposed slots for slidably receiving the body portions of said support members.
   said slots being narrower than the width of said pedestals, and
   a generally conical sleeve slidably disposed on said spindle for reception in said central opening in said wheel for locating said wheel in symmetrical relationship to said spindle.

2. Apparatus according to claim 1 wherein said wheel support members comprise
   generally cylindrical pins each having a tapered upper end portion for reception in said mounting holes.

3. Apparatus according to claim 1 wherein
   said slots are radially disposed relative to said central operning.

4. Apparatus according to claim 3 wherein
   said spindle is provided with shoulder means for supporting said plate in spaced parallel relationship with said planar surface.

* * * * *